(12) United States Patent
Song

(10) Patent No.: US 6,373,805 B1
(45) Date of Patent: Apr. 16, 2002

(54) METHOD AND APPARATUS FOR RECORDING OPTICAL INFORMATION

(75) Inventor: Tae Sun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/373,538

(22) Filed: Aug. 13, 1999

(30) Foreign Application Priority Data

Aug. 14, 1998 (KR) .............................................. 98-32979

(51) Int. Cl.[7] .................................................. G11B 7/00
(52) U.S. Cl. ...................... 369/100; 369/47.1; 369/53.1; 369/275.1
(58) Field of Search .............................. 369/100, 44.13, 369/44.26, 44.28, 44.29, 44.35, 47.1, 53.1, 275.1, 275.4

(56) References Cited

U.S. PATENT DOCUMENTS 5,335,214 A * 8/1994 Motoba et al. .......... 369/44.28
5,870,353 A * 2/1999 Morimoto et al. ............ 369/13

* cited by examiner

Primary Examiner—Muhammad Edun
(74) Attorney, Agent, or Firm—Birch, Stewart, Kolasch & Birch, LLP

(57) ABSTRACT

An optical information recording method and an apparatus that is capable of forming recording marks having the same length on a land and a groove track of an optical recording medium. The optical information recording method and apparatus identify whether any one of a land and a groove track on an optical recording medium is accessed. Then, the optical information recording method and apparatus establish differently an outputting manner of recording lights to be irradiated on the optical recording medium on the basis of a detecting resultant of the land and groove tracks.

7 Claims, 6 Drawing Sheets

METHOD AND APPARATUS FOR RECORDING OPTICAL INFORMATION

BACKGROUND OF THE INVENTION

1. Field of the Invention

This invention relates to a method and an apparatus for recording an information on an optical recording medium having land and groove tracks.

2. Description of the Related Art

Nowadays, a need of larger capacity has been increased in an optical recording/reproducing field or an opto-magnetic recording/reproducing field in order to record an information that is greatly enlarged in the quantity. Accordingly, in optical discs such as a DVD-RAM (digital versatile disc-random access memory) and so on, there has been suggested so-called a land/groove recording system having an information recorded on both of land and groove tracks. Actually, a disc of a phase-change recording system such as DVD-RAM and a disc of an opto-magnetic recording system such as ASMO (Advanced Storage Magneto-Optical) are known as the disc of land/groove recording system.

Referring to FIGS. 1 and 2, there are shown an optical recording medium 20 having land tracks 22 and groove tracks 24. The optical recording medium 20 consists of an information recording and reproducing layer 26, a reflective layer 28 and a protective layer 32 formed sequentially under a substrate 30. The information recording and reproducing layer 26 records an information and the reflective layer 28 reflects a light beam. The substrate 30 and the protective layer 32 are formed by a material hating relatively low heat conductivity. For example, PMMA (Poly Methyl MethAcrylate) can be used as the substrate material and the protective layer 32 can be formed by a resin class. Meanwhile, the information recording and reproducing layer 26 and the reflective layer 28 are formed by the material having a relatively high heat conductivity. The information recording and reproducing layer 26 can consist of a recording layer 26a, a reproduction supporting layer 26b and a reproducing layer 26c, as shown in FIG. 3. The recording layer 26a and the reproduction supporting layer 26b are formed by a TbFeCo and a GdFe, respectively. The reproducing layer 26c and the reflective layer 28 are made of a GdFeCo and a Al, respectively.

In such an optical recording medium as described above, the information recording and reproducing layer 26 positioned at the land track 22 lies adjacent to the materials having the high heat conductivity. Meanwhile, the information recording and reproducing layer 26 positioned at the groove track 24 is contiguous to the materials having a low heat conductivity. Accordingly, the land and groove tracks 22 and 24 have a different thermal conductivity when a light beam is irradiated on the optical recording medium 20. As a result, a thermal characteristic difference appears between the land and groove tracks 22 and 24.

The thermal characteristic difference allows recording pits formed on the land and groove tracks 22 and 24 to have a different length although the light beam of the same recording power is irradiated on the optical recording medium with the land and groove tracks 22 and 24. In detail, the material on the areas adjacent to the land track 22 radiates a great amount of thermal energies when the light beam is irradiated on the land track 22. This results from that the material on the area adjacent to the land track 22 has the high heat conductivity. Thus, a relatively short recording pits are formed on the information recording and reproducing layer 26 corresponding to the land track 22. Meanwhile, the material on the areas adjacent to the groove track 24 radiates a small amount of thermal energies when the light beam is irradiated on the groove track 24. This results from that the material on the area adjacent to the groove track 24 has the low heat conductivity. Therefore, a relatively long recording pits are formed on the information recording and reproducing layer 26 corresponding to the land track 24. In other words, although the light beam having the same recording power is irradiated on the land and groove tracks 22 and 24, the recording pits formed on the land and groove tracks 22 and 24 have a different length according to the widths of the land and groove tracks 22 and 24 and the depth from the land track 22 to the groove track 24. Due to this, recording errors can be generated when the information is recorded on the optical recording medium.

Further, the recording errors can increase more and more as the capacity of the opical recording mdeium is enlarged. This results from the tact that the difference between the recording pits on the land and groove tracks 22 and 24 is enlarged in accordance with decreasing of the land and groove tracks 22 and 24 in width.

SUMMARY OF THE INVENTION

Accordingly, it is an object of the present invention to provide an optical information recording method and an apparatus that can form recording marks having the same length on a land and a groove track of an optical recording medium.

In order to achieve these and other objects of the invention, an optical information recording method according to an aspect of the present invention includes the steps of: identifying whether any one of a land and a groove track on an optical recording medium is accessed; and establishing differently an outputting manner of recording lights to be irradiated on the optical recording medium on the basis of a identifying resultant for the land and groove tracks.

An optical information recording method according to another aspect of the present invention allows a rotating speed of optical recording medium to be different depending on a land/groove identification signal for indicating a land and a groove track on the optical recording medium.

An optical information recording apparatus according to still another aspect of the present invention includes: distinguishing means for identifying whether any one of a land and a groove track is accessed; and recording means for establishing differently an outputting manner of recording lights to be irradiated on the optical recording medium on the basis of an identifying resultant of the distinguishing means and for performing a recording operation.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
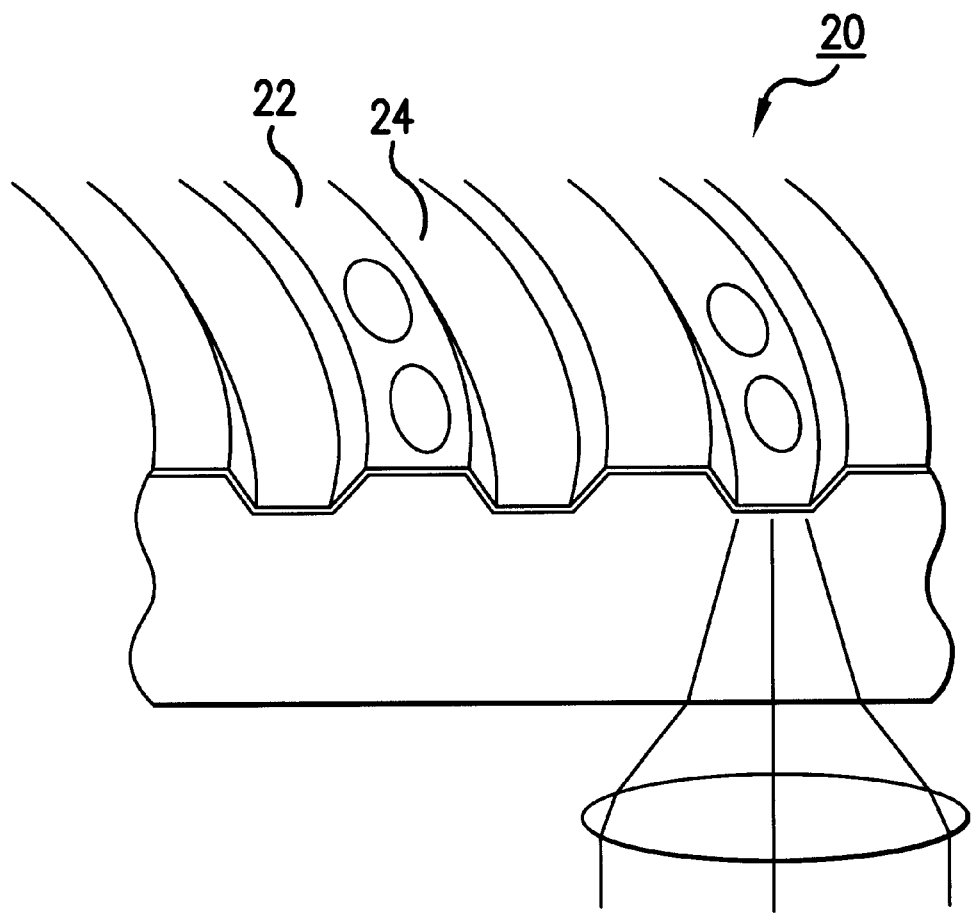
FIG. 1 is a schematic view showing an optical recording medium having a structure of land and groove.
Figure 2:
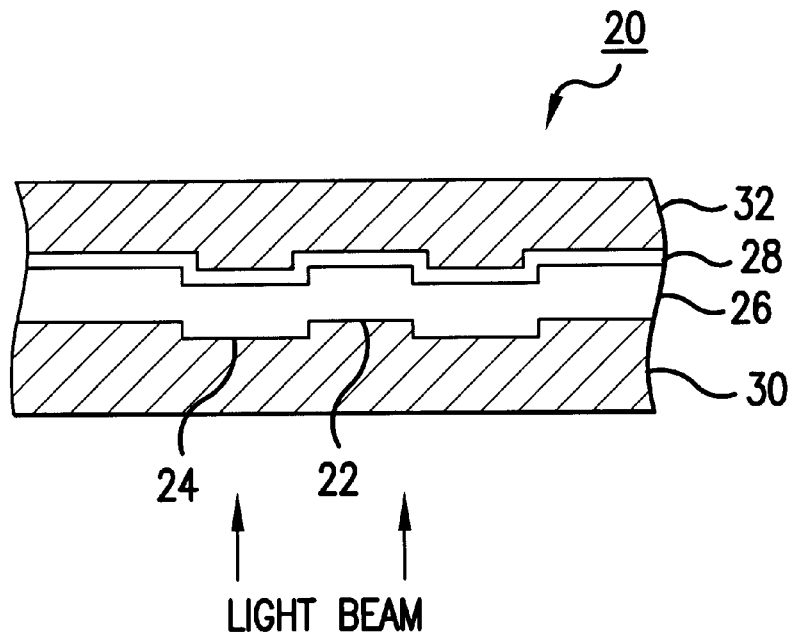
FIG. 2 is a sectional view showing the structure of the optical recording medium in FIG. 1.
Figure 3:
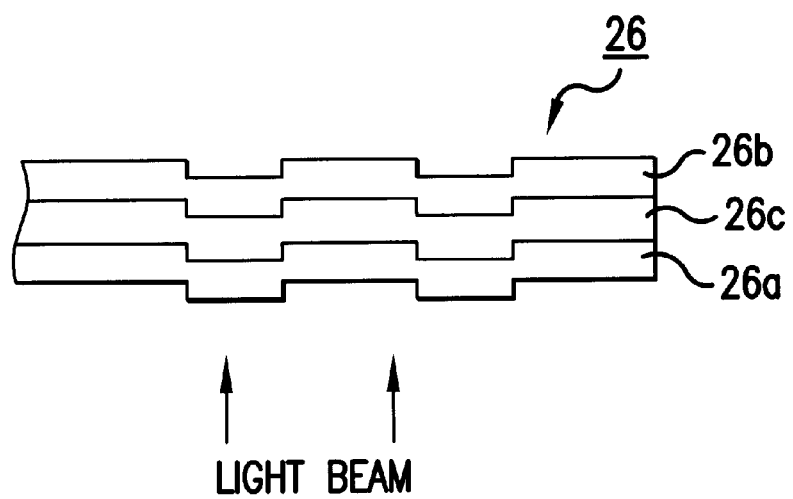
FIG. 3 is a sectional view showing in detail the information recording layer and the reproduction layer in FIG. 2.
Figure 4:
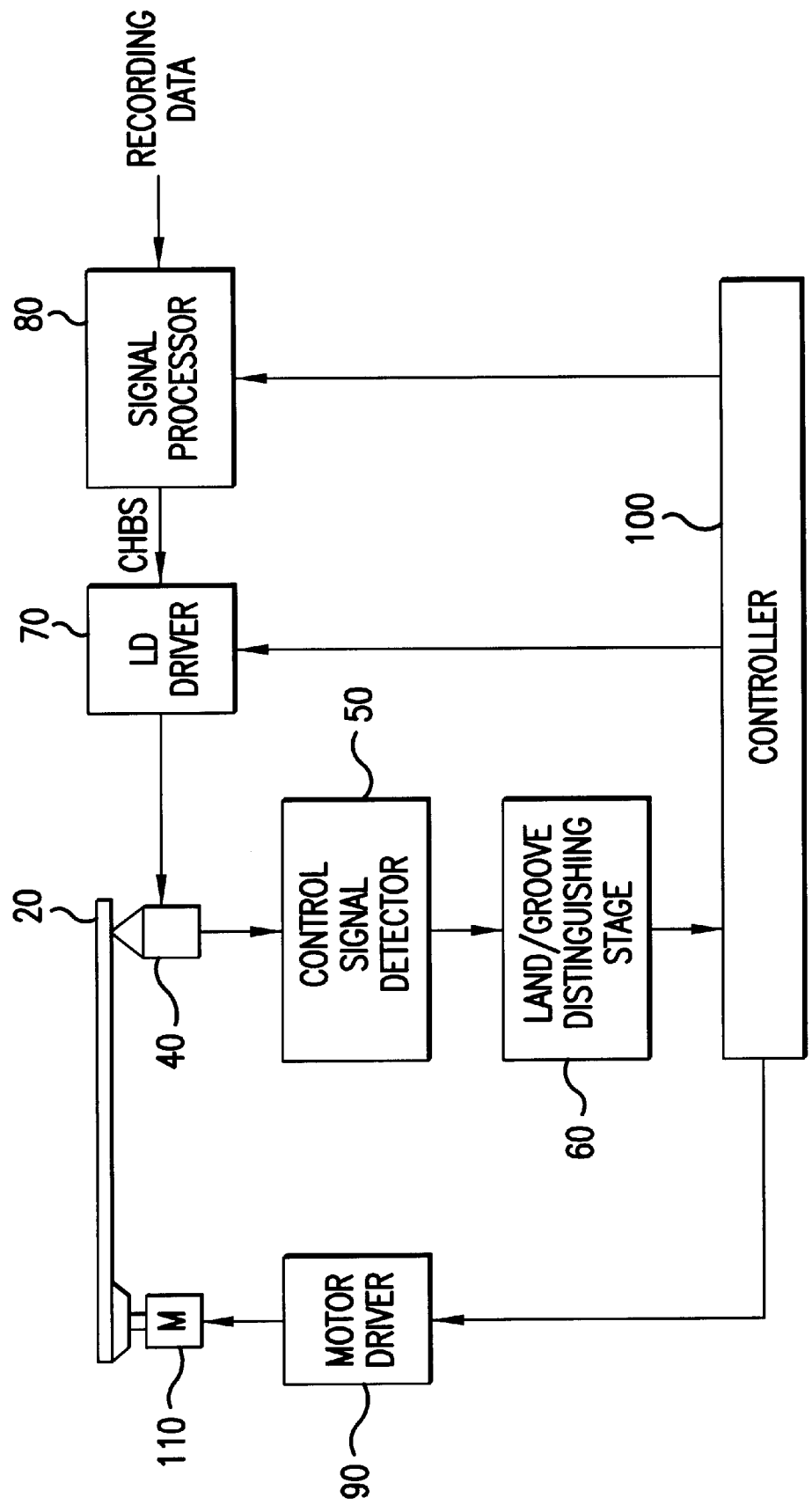
FIG. 4 is a schematic block diagram showing the configuration of an optical information recording apparatus according to an embodiment of the present invention.
Figure 5:
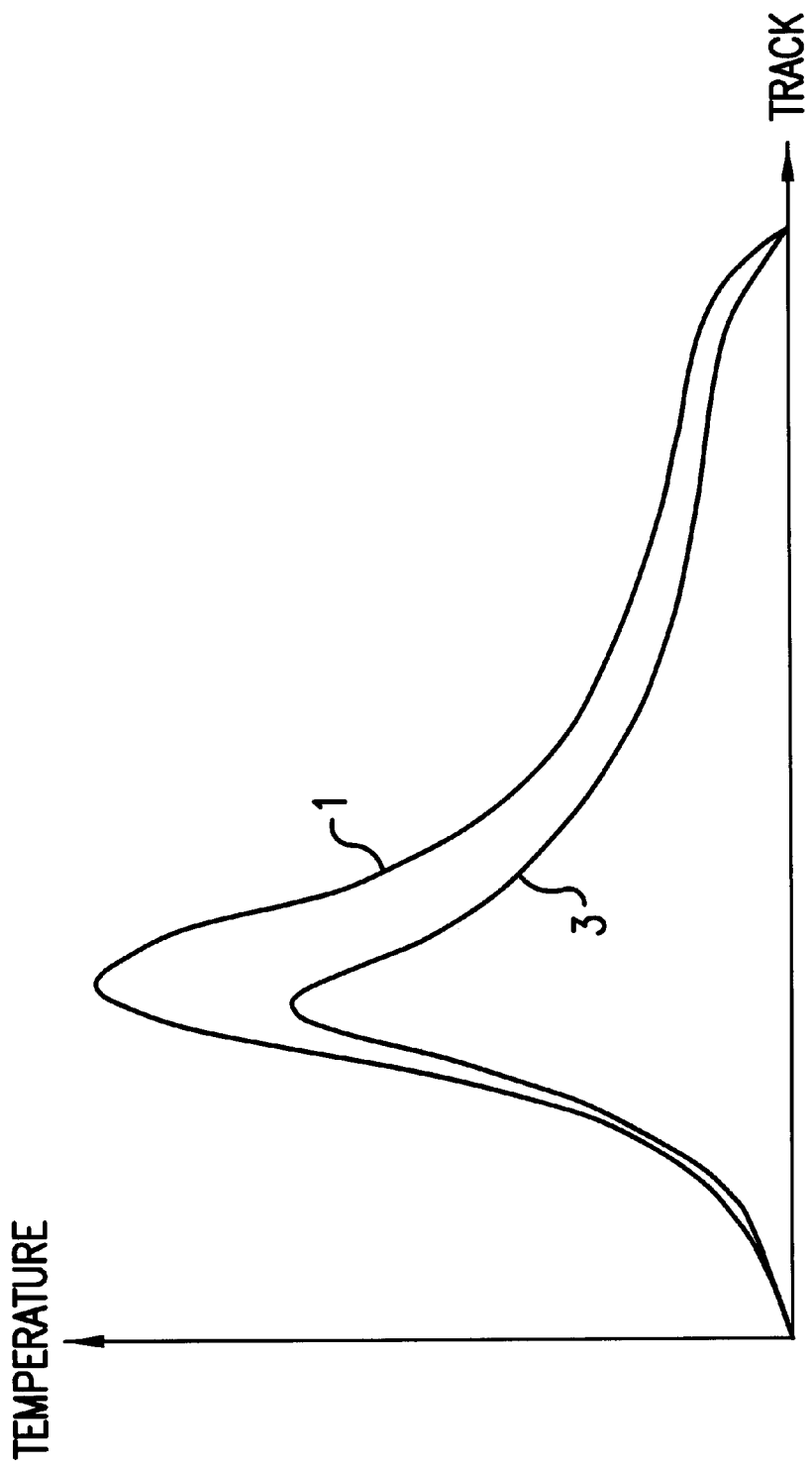
FIG. 5 is a characteristic view showing temperature profiles on a land and a groove when light beams having the same power level are respectively irradiated on the land and the groove.

Referring to FIG. 4, there is shown a optical information recording apparatus according to an embodiment of the present invention. The optical information apparatus of FIG. 4 has an optical pickup 40 for recording a data on a optical recording medium 20 and reproducing the data from the optical medium 20, a control signal detector 50 for detecting a control signal from an electrical signal generated at the optical pickup 40, and a land/groove distinguishing stage 60 for identifying a land/groove track on the basis of the control signal from the control signal detector 50. Also, the optical information apparatus includes a signal processor 80 for converting a recording data into a channel bit stream (hereinafter, CHBS), a controller 110 for controlling the circuits of the optical recording apparatus in accordance with a land/groove identification signal from the land/groove distinguishing stage 60, and a LD (Laser Diode) driver 70 for driving a LD included in the optical pickup 40 according to the CHBS from the signal processor 80 and controlling a record power of light beam on the basis of a control signal from the controller 110. The signal processor 80 converts the recording data into the CHBS and applies the CHBS to the LD driver 70. The LD driver 70 responds to the CHBS to switch the LD of the optical pickup 40. The optical pickup 40 irradiates the light beam on a land track 22 and a groove track 24 of the optical recording medium 20 as shown in FIG. 1, to form recording marks corresponding to the recording data. The land track 22 has the temperature profile different from that of the groove track 24 in the case that the light beams having the same recording power are irradiated on the land and groove tracks 22 and 24, as show in FIG. 5. In FIG. 5, a curve 1 represents a temperature profile on the groove track 24 when the light beam is irradiated on the groove track 24. Another curse 3 shows a temperature profile on the land track 22 when the light beam is irradiated on the land track 22. The temperature profile difference between the land and groove tracks 22 and 24 for the light beam having the same recording power results from that the land track 22 has a heat conductivity different from that of the groove track 24. Due to this, the record marks formed on the land and groove tracks 22 and 24 are different from each other in length. To solve this problem, the optical information recording apparatus according to an embodiment of the present invention sets up differently the intensities of the light beams to be irradiated on the land and groove tracks 22 and 24 such that the temperature profile on the land track 22 is equal to that of the groove track 24. Therefore, the marks formed on the land and groove tracks 22 and 24 by the optical information recording apparatus according to an embodiment of the present invention have the same length.

In order to set up the intensity of the light beam in accordance with the land and groove tracks 22 and 24, the optical information recording apparatus according to an embodiment of the present invention employs the land/groove distinguishing stage 60 for identifying whether the track accessed by the optical pickup 40 is the land track 22 or the groove track 24 The procedure for identifying of the land and groove tracks 22 and 24 will be described in detail. The optical pickup 40 irradiates the light beam on the optical recording medium 20 and converts the quantity of the lights reflected by the optical recording medium 20 into an electrical signal. The control signal detector 50 detects a tracking error signal from the electrical signal generated at the optical pickup 40 and applies the tracking error signal to the land/groove distinguishing stage 60. Then, the control signal detector 50 inverts the polarity of the tracking error signal in accordance with whether the track accessed by the optical pickup 40 is the land track 22 or the groove track 24. The land/groove distinguishing stage 60 identifies the land/groove track on the basis of the tracking error signal and applies a land/groove identification signal to the controller 110. The controller 110 responds to the land/groove identification signal and supplies a control signal corresponding to the land track 22 or the groove track 24 to the LD driver 70. Thus, the LD driver 70 responds to the control signal from the controller 110 and adjusts the intensity of the light beam to be generated at the optical pickup 40, thereby allowing the intensities of the land track 22 to be the same to that of the groove track 24.

The method for adjusting the intensity of the light beam sets up the intensity of the light beam irradiated on the groove track 24 lower than that of the light beam irradiated on the land track 22. If the land/groove distinguishing stage 60 identifies that the groove track 24 has been accessed, the controller 110 controls the LD driver 70 to have the power level lower than a previously established power level, thereby forming the recording marks corresponding to the CHBS on the groove track 24 by a light beam of low power level. Meanwhile, when the land/groove distinguishing stage 60 identifies that the land track 22 has been accessed, the controller 110 enables the LD driver 70 to maintain the previously established power level so as to form the recording marks corresponding to the CHBS on the land track 22 by a light beam of high power level. In this case, the power level of the light beam irradiated on the groove track must be set up appropriately such that the recording marks formed on the land and groove tracks 22 and 24 are the same to each other in length.

Figure 6:
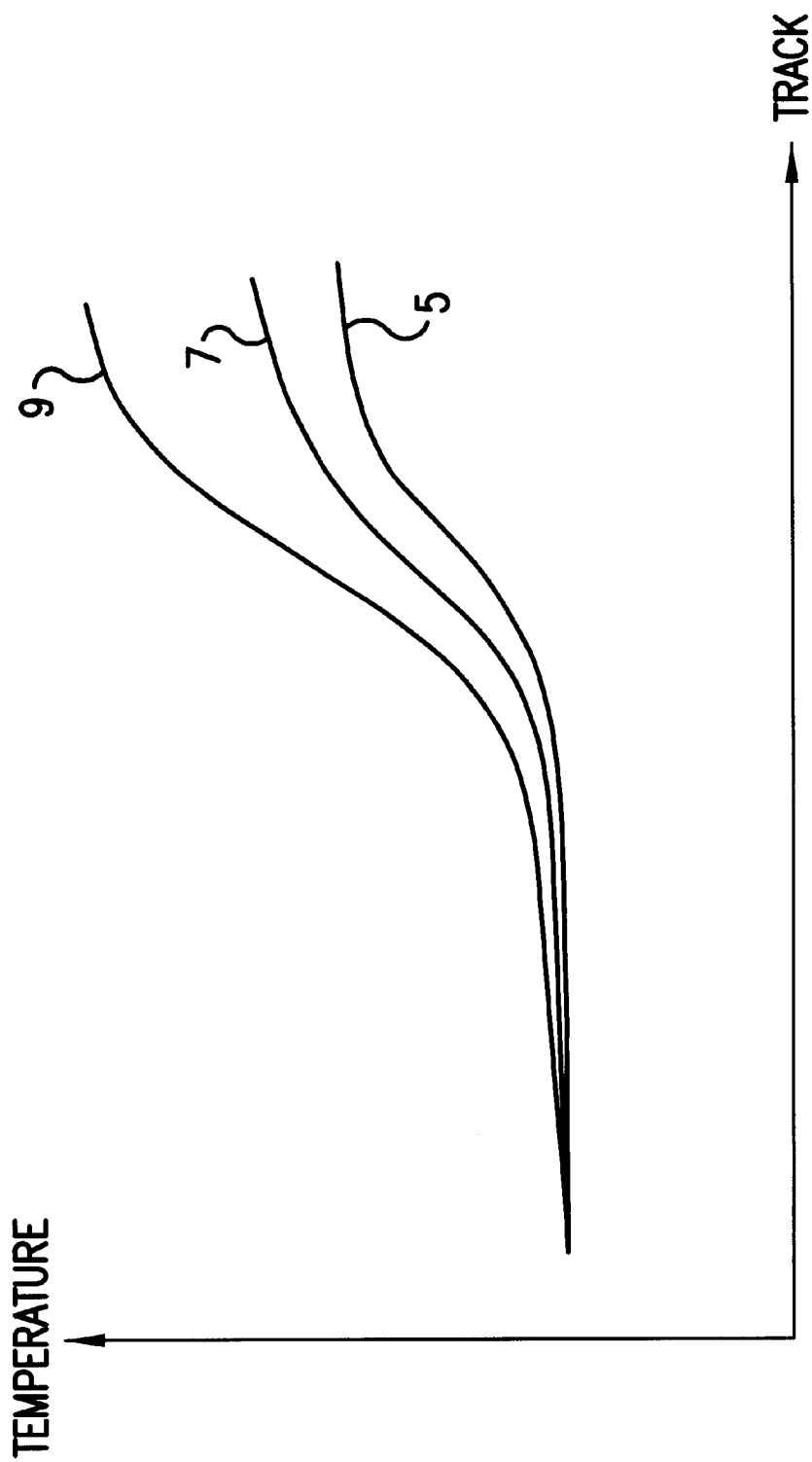
FIG. 6 a characteristic view explaining temperature profiles on a disc in accordance with a duty rate of pulse when an information is recorded by a laser pulse train on the disc.

On the other hand, the recording marks formed on the land and groove tracks 22 and 24 identifies each other in length by adjusting the duty ratio of the light beam in accordance with the land and groove tracks 22 and 24. In detail, the controller 110 controls the LD driver 70 to have the pulse duty ratio lower than a previously established pulse duty ratio when the land/groove distinguishing stage 60 identifies that the groove track 24 has been accessed, thereby forming the recording marks corresponding to the CHBS on the groove track 24 by a light beam pulse of low duty ratio. Meanwhile, if the land/groove distinguishing stage 60 identifies that the land track 22 has been accessed, the controller 110 enables the LD driver 70 to maintain the previously established pulse duty ratio so as to form the recording marks corresponding to the CHBS on the land track 22 by a light beam pulse of high duty ratio. In this case, the duty ratio of the light beam pulse irradiated on the groove track 22 must be set up appropriately such that the recording marks formed on the land and groove tracks 22 and 24 are the same to each other in length, FIG. 6 shows temperature profiles on the land and groove tracks 22 and 24 in accordance with the duty ratio of the light beam pulse. In FIG. 6, a curse 5 represents a temperature profile on the track when the light beam pulse is set up at low duty ratio. Another curse 7 shows a temperature profile on the track in the case that the light beam pulse has a middle duty ratio. Still another curse 9 depicts a temperature profile on the track when the duty ratio of the light beam pulse is high. Wherein, the temperature on the track occupied by a spot of the light beam becomes high relatively to the duty ratio of the light beam pulse. In other words, the temperature on the track occupied by the spot of the light beam is high when the duty ratio of the light beam pulse is established at a high value, while is low in the case that the light beam pulse has a duty ratio of low value. In this case, the duty ratio of the light beam irradiated on the groove track 24 must be established appropriately to identify the recording mark formed on the land track 22 with the recording mark formed on the groove track 24.

Further, the optical information recording apparatus according to an embodiment of the present invention includes a motor driver 90 for controlling a rotation speed of the optical recording medium 20 depending on a control signal from the controller 110, and a spindle motor 100 for rotating the optical recording medium 20 upon a control of the motor driver 90. The motor driver 90 adjusts differently the rotation speed of the spindle motor 100 in accordance with the land and groove tracks 22 and 24 such that the temperature profiles on the land and groove tracks 22 and 24 are equal to each other. Then, the controller 110 responds to the land/groove identification signal and generates the control signal for controlling the motor driver 90.

Figure 7:
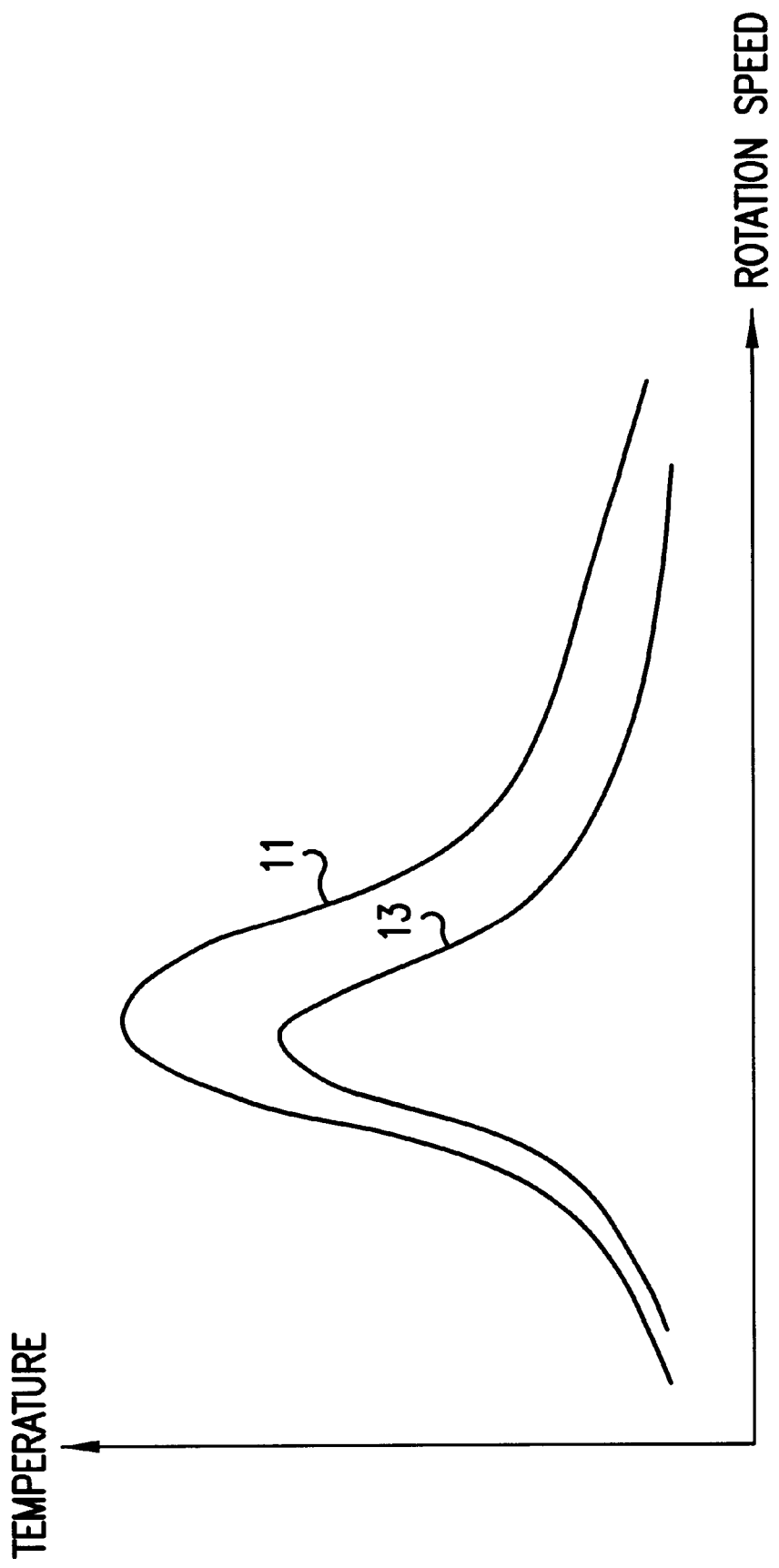
FIG. 7 a characteristic view depicting temperature profiles on a land and a groove in accordance with a rotation speed of disc.

A method for adjusting the rotation speed of the optical recording medium 20 will be described. The method for adjusting the rotation speed of the optical recording medium 20 allows the recording marks formed on the land and groove tracks 22 and 24 to be the same to each other in length. In detail, the controller 110 allows the motor driver 90 to rotate the optical recording medium 20 at the rotation speed higher than a previously established rotation speed when the land/groove distinguishing stage 60 identifies that the groove track 24 has been accessed, thereby forming the recording marks corresponding to the CHBS on the groove track 24 of the optical recording medium 20 rotated at the low rotation speed. Meanwhile, if the land/groove distinguishing stage 60 identifies that the land track 22 has been accessed, the controller 110 enables the motor driver 90 to rotate the optical recording medium 20 at the previously established rotation speed so as to form the recording marks corresponding to the CHBS on the land track 22 of the optical recording medium 20 rotated at the high rotation speed. In this to case, the rotation speed of the groove track 24 must be set up appropriately such that the recording marks formed on the land and groove tracks 22 and 24 are the same to each other in length. FIG. 7 shows temperature profiles on the land and groove tracks 22 and 24 responding to the rotation speed. In FIG. 7, a curse 11 represents a temperature profile on the groove track varying with the rotation speed of the optical recording medium 20. Another curse 13 shows a temperature profile on the land track 24 responding to the rotation speed of the optical recording medium 20. Referring to the curses 11 and 13 of FIG. 7, the temperature on the land and groove tracks becomes high and after low in a constant range of rotation speed. In other words, the recording marks formed on the land and groove tracks 22 and 24 can be equal to each other by mean of establishing the rotation speed of the groove track 24 lower than that of the land track 22. In this case, the rotation speed of the groove track 24 must be set up to an appropriate rotation speed lower than that of the land track 22 to identify the recording mark formed on the land track 22 with the recording mark formed on the groove track 24. Also, the recording marks formed on the land and groove tracks 22 and 24 can be equal to each other by mean of establishing the rotation speed of the groove track 24 higher than that of the land track 22. In this case, the rotation speed of the groove track 24 must be established in the proper rotation speed higher than that of the land track 22 to identify the recording mark formed on the land track 22 with the recording mark formed on the groove track 24.

As described above, an optical information recording apparatus and a method according to the present invention adjusts the power level of the light beam, the duty ratio of the light beam pulse, or the rotation speed of the optical recording medium in accordance with the land and groove tracks on the optical recording medium, thereby forming the recording marks having the same length on the land and groove tracks. Further, since the recording marks are formed on the land and groove tracks in the same length, an optical information recording apparatus and a method according to the present invention can record an information on the optical recording medium in the high density.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording an information on an optical recording medium having a land and a groove track, comprising the steps of:

identifying whether any one of the land and groove tracks is accessed; and establishing differently an outputting manner of recording lights to be irradiated on the optical recording medium on the basis of a detecting resultant of the land and groove tracks, wherein the recording lights irradiated on the groove track have a power lever lower than that of the recording lights irradiated on the land track.

2. The method as claimed in claim 1, wherein the recording lights are irradiated on the optical recording medium in such a manner of pulses having a duty ratio different from each other in accordance with the land and groove tracks, the duty ratio responding to a land/groove identification signal indicating any one of the land and groove tracks.

3. The method as claimed in claim 2, wherein the pulse of the recording lights irradiated on the groove track is lower than the pulse of the recording lights irradiated on the land track in the duty ratio.

4. An optical information recording method allowing a rotating speed of an optical recording medium to be different depending on a land/groove identification signal for indicating a land and a groove track on the optical recording medium, wherein the rotation speed of the groove track is set to be lower than that of the land track.

5. An apparatus for recording an information on a optical recording medium having a land and a groove track, comprising:

distinguishing means for identifying whether any one of the land and groove tracks is accessed; and recording means for establishing differently an outputting manner of recording lights to be irradiated on the optical recording medium on the basis of an identifying resultant of the distinguishing means and for performing a recording operation, wherein the recording lights irradiated on the groove track have a power lever lower than that of the recording lights irradiated on the land track.

6. The apparatus as claimed in claim 5, wherein the recording lights are irradiated on the groove track in such a manner of a pulse having a duty ratio lower than that of the pulse for the recording lights irradiated on the land track.

7. The apparatus as claimed in claim 5, wherein the groove track rotates at a rotation speed higher than that of the land track.

* * * * *